(12) United States Patent
Mensch et al.

(10) Patent No.: US 7,694,341 B2
(45) Date of Patent: Apr. 6, 2010

(54) RUN-TIME CODE INJECTION TO PERFORM CHECKS

(75) Inventors: James Mensch, San Jose, CA (US); Jerry Hauck, Windemere, FL (US); Ronnie Misra, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1266 days.

(21) Appl. No.: 11/207,045

(22) Filed: Aug. 18, 2005

(65) Prior Publication Data

US 2007/0006183 A1 Jan. 4, 2007

Related U.S. Application Data

(63) Continuation-in-part of application No. 11/144,867, filed on Jun. 3, 2005, now abandoned.

(51) Int. Cl.
*H04L 9/32* (2006.01)
(52) U.S. Cl. .................. 726/26; 726/30; 713/189
(58) Field of Classification Search ......... 713/164–169, 713/189–194; 380/200–202; 726/26; 705/51, 705/57–59
See application file for complete search history.

(56) References Cited

U.S. PATENT DOCUMENTS

2005/0119978 A1* 6/2005 Ates .................. 705/67

OTHER PUBLICATIONS

"Digital Signature Standard (DSS)." Federal Information Processing Standards Publication 186. www.itl.nist.gov/fipspubs/fip186.htm. May 19, 1994.

Bajikar, Sundeep. "Trusted Platform Module (TPM) based Security on Notebook PCs—White Paper." Mobile Platforms Group: Intel Corporation. Jun. 20, 2002. pp. 1-20.
"TCG Specification Architecture Overview." Revision 1.2. Trusted Computing Group, Incorporated. Apr. 28, 2004. pp. 1-54.
"Trusted Platform Modules Strengthen User and Platform Authenticity." Trusted Computing Group, Incorporated. Jan. 2005. pp. 1-8.
"TPM Main—Part 1 Design Principles." Revision 85. Trusted Computing Group, Incorporated. Feb. 13, 2005. pp. 1-167.
"TPM Main—Part 2 TPM Structures." Level 2 Revision 85. Trusted Computing Group, Incorporated. Feb. 18, 2005. pp. 1-181.

* cited by examiner

*Primary Examiner*—Hosuk Song
(74) *Attorney, Agent, or Firm*—Wong, Cabello, Lutsch, Rutherford & Brucculeri LLP

(57) ABSTRACT

A digital rights management system permits an application owner to cause code to be injected into the application's run-time instruction stream so as to restrict execution of that application to specific hardware platforms. In a first phase, an authorizing entity (e.g., an application owner or platform manufacturer) authorizes one or more applications to execute on a given hardware platform. Later, during application run-time, code is injected that performs periodic checks are made to determine if the application continues to run on the previously authorized hardware platform. If a periodic check fails, at least part of the application's execution string is terminated—effectively rendering the application non-usable. The periodic check is transparent to the user and difficult to circumvent.

40 Claims, 5 Drawing Sheets

RUN-TIME CODE INJECTION TO PERFORM CHECKS

BACKGROUND

This application constitutes a continuation-in-part from, and claims priority to, U.S. patent application Ser. No. 11/114,867, entitled "Run-Time Code Injection to Perform Checks," filed 3 Jun. 2005 and which is hereby incorporated by reference.

The invention relates generally to digital rights management and more particularly, by way of example, to performing a check at run-time to determine if a software application is authorized to execute on a specific hardware platform.

It has become common practice for computer system manufacturers to preload their hardware platforms with one or more software applications. The single, most widespread, application being the operating system. In many instances, the developer of an application may wish to restrict its execution to a specific computer system or hardware platform. Once an application has been distributed, however, the application's developer/owner has little control over its subsequent re-distribution. This is becoming an especially vexing problem in that virtually every new computer system in the marketplace includes the software and hardware needed to: make exact copies of digital content (e.g., applications and multimedia content); transfer these copies to magnetic or optical disks; and distribute these copies via a computer network (e.g., the Internet or corporate or academic intranet).

The application owner may, of course, require the user to promise not to copy, distribute or use the application on another platform as part of the transaction by which the user obtains their copy. Such promises are, however, easy to make and easy to break. The application owner may also attempt to prevent re-distribution or re-use in a number of ways, usually involving encryption and decryption of the application or the use of specialized security hardware devices ("dongles"). There is very little, however, that these approaches can do to thwart a determined user.

Thus, it would be beneficial to provide a mechanism to restrict the execution of one or more applications to a specific hardware platform that is transparent to the user.

SUMMARY

In one embodiment, the invention provides a method to manage the execution rights of an application. The method includes selecting an execution unit associated with the application whose execution is to be monitored and controlled. Once selected, instructions are injected into the application's run-time instruction sequence to generate a cryptologic challenge. In one embodiment, instructions are injected into the application's run-time instruction sequence at a later time to obtain and verify a response to the cryptologic challenge. If the obtained response fails verification, the execution unit is halted. Illustrative execution units include threads and processes. Illustrative applications include operating system and user applications. Illustrative operating system applications include user-interface critical applications. Methods in accordance with the invention may be implemented as computer executable instructions and stored in any media that is readable and executable by a computer system.

DETAILED DESCRIPTION

Methods, devices and systems to limit the execution of software applications to unique hardware platforms by injecting code in a run-time environment are described. Illustrative software applications include, but are not limited to, operating systems, user applications and specific versions of operating systems and user applications. Illustrative hardware platforms include, but are not limited to, personal computers, server computer systems, personal digital assistant devices and mobile telephones. While the claimed subject matter is not so limited, the following embodiments of the invention, described in terms of Trusted Platform Modules ("TPMs") and operating system software from APPLE COMPUTER, INC. of Cupertino, Calif., are illustrative only and are not to be considered limiting in any respect.

One of ordinary skill in the art will recognize that TPMs are commercially available components that perform a set of cryptographic ("crypto") capabilities internally such that hardware and software agents outside the TPM do not have access to the execution of these functions. Accordingly, hardware and software external to the TPM can only provide input-output to the TPM. Illustrative crypto capabilities include, but are not limited to, an RSA engine for encryption and decryption operations, a SHA-1 hash algorithm engine, a random number generator and private, non-volatile, memory. Stored within a TPM's non-volatile memory is an endorsement key comprising a public/private key pair that is unique to each instance of a TPM—the private component of which is never exposed outside the TPM. A TPM is typically embodied in a semiconductor chip that is affixed to a hardware platform's circuit board (e.g., a computer system's motherboard). It will further be recognized that TPM operations may conform to Trusted Computing Platform Alliance ("TCPA") specifications as published by the Trusted Computing Group (see https://www.trustedcomputinggroup.org/home), including the support of industry-standard cryptographic Application Programming Interfaces ("APIs").

Figure 1:
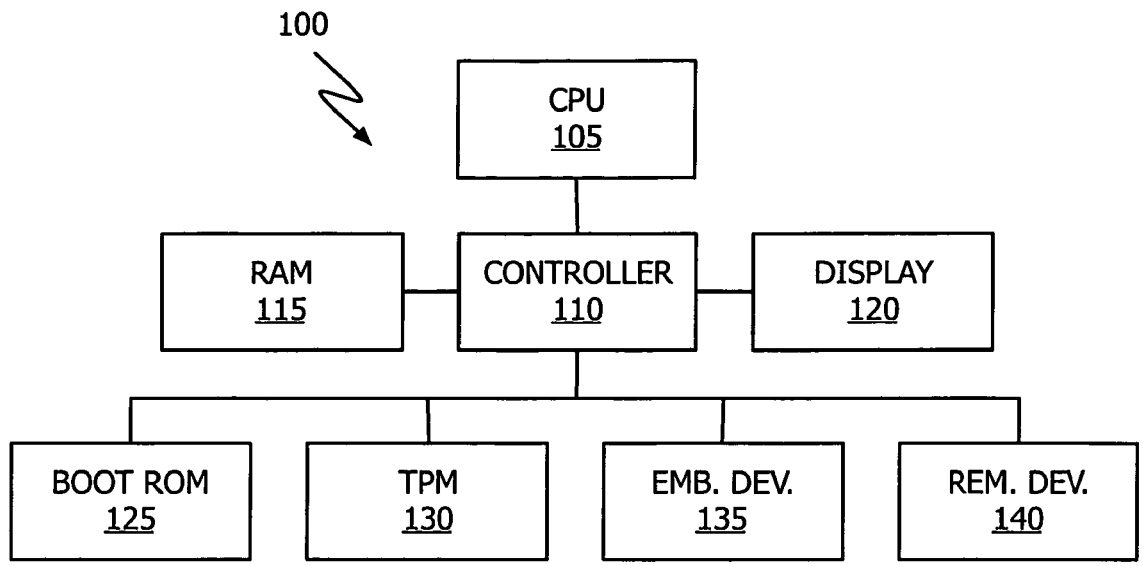
FIG. 1 shows, in block diagram form, a computer system in accordance with one embodiment of the invention.

FIG. 1 shows an illustrative personal computer system architecture incorporating a TPM. As shown, computer system 100 includes central processing unit ("CPU") 105, system controller 110, random access or volatile memory ("RAM") 115, display 120, Boot read-only memory ("ROM") 125, TPM 130, one or more embedded devices 135 and zero or more removable devices 140. Illustrative embedded devices include, but are not limited to, audio and storage devices. Illustrative removable devices include, but are not limited to, keyboards, pointer devices and storage devices. In illustrative system 100, encryption keys and other critical security information are stored in non-volatile memory within TPM 130 and, as noted above, CPU 105 (or software executing on CPU 105) communicates with TPM 130 via industry-standard APIs.

Figure 2:
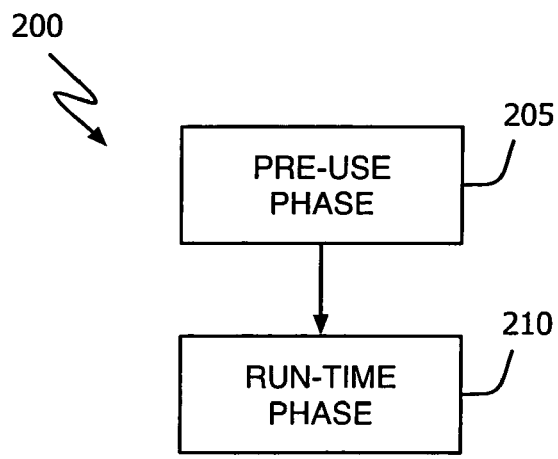
FIG. 2 shows, in flowchart form, an authorization technique in accordance with the invention.

Referring to FIG. 2, authorization technique 200 in accordance with the invention generally includes pre-use phase 205 and run-time phase 210. During pre-use phase 205, a hardware platform is authorized to run specified applications such as, for example, an operating system or a specified version thereof. In one embodiment, pre-use phase 205 is performed at the time a hardware platform (e.g., computer system) is manufactured or, at least, prior to delivery to the end-user. During run-time phase 210, periodic challenges are generated that verify the platform is authorized to use the specified application(s). Accordingly, run-time phase 210 is performed during end-user activities on a generally on-going basis.

Figure 3:
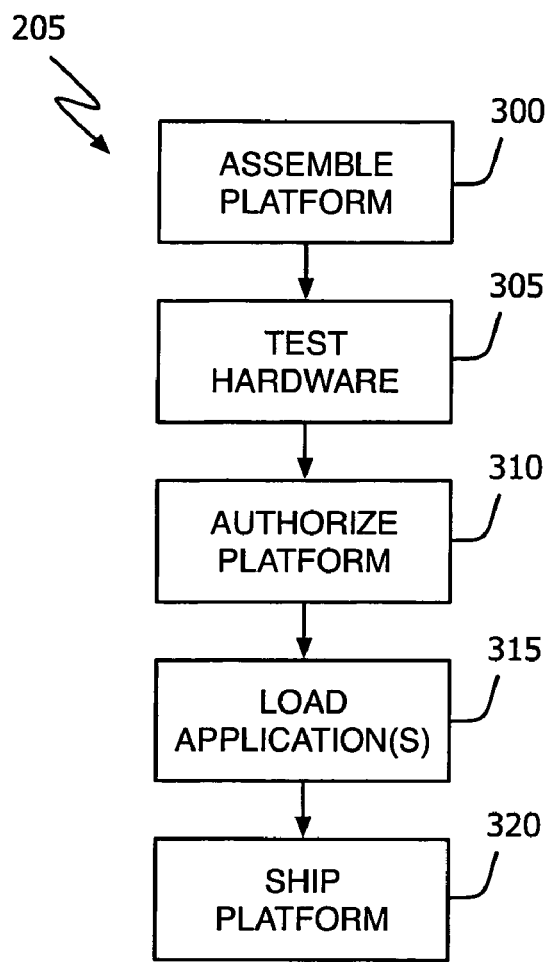
FIG. 3 shows, in flowchart form, a pre-use phase in accordance with FIG. 2 for one embodiment of the invention.

Referring to FIG. 3, in one embodiment pre-use phase 205 is performed at platform manufacture time. Following assembly of the target hardware platform including, intera/ia, inclusion of TPM 130 (block 300), the unit's hardware is tested (block 305). On successful conclusion of hardware tests, the platform is authorized to execute the specified applications (block 310), after which applications may be loaded onto the platform's non-volatile storage device(s) (block 315) and the unit shipped to the end-user (block 320).

Figure 4:
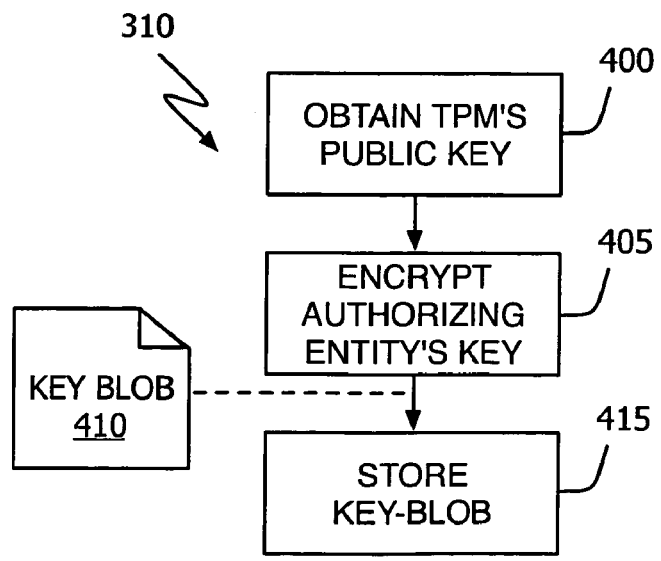
FIG. 4 shows, in flowchart form, hardware platform authorization in accordance with one embodiment of the invention.

The acts of authorizing a hardware platform in accordance with one embodiment of the invention and pursuant to block 310 of FIG. 3 are illustrated in FIG. 4. As shown, the TPM's public key is obtained (block 400) and used to encrypt the authorizing entity's key (block 405). That is, the authorizing entity's private key may be encrypted external to TPM 130. In one embodiment, the authorizing entity's key may be a key unique to the application being authorized. In another embodiment, the authorizing entity's key may be a key unique to the entity (e.g., the business). One of ordinary skill in the art will recognize that key blob 410 resulting from the acts of block 405 is clear-text. That is, it can be read, stored and transmitted as ordinary text. Once generated, the key blob is stored on the target platform (block 415). Typically, key blob 410 would be stored within TPM 130, although it may also be stored in non-volatile memory (e.g., non-volatile RAM and/or disk memory) associated with system 100. In another embodiment, the authorizing entity's key may be transmitted to the TPM which encrypts it using internal hardware capabilities (see discussion above). Again, the resulting key block could be stored within TPM 130 and/or in non-volatile memory associated with the rest of system 100.

Figure 5:
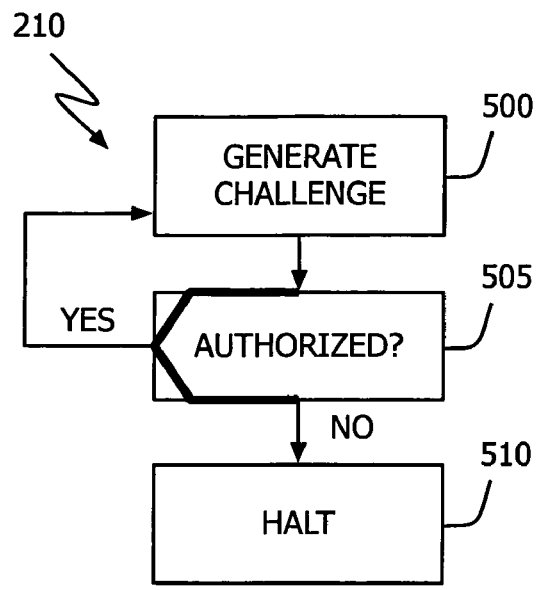
FIG. 5 shows, in flowchart form, a run-time phase in accordance with FIG. 2 for one embodiment of the invention.

At some point in time following completion of pre-use phase 205, a user obtains and begins using system 100. It is at this time that run-time phase 210 begins. Referring to FIG. 5, run-time phase 210 periodically generates a challenge to system 100 (block 500). As discussed more fully below, a challenge causes system 100 to inject code into an application's executing code sequence/stream that causes data to be sent to TPM 130 for cryptologic signing. The resulting signature is then checked to verify that it was signed using the authorizing entity's key in accordance with FIG. 4. If the comparison determines that the platform is authorized to execute one or more running applications (the "YES" prong of block 505), another challenge is generated in accordance with the acts of block 500 at some time in the future. If the platform is not authorized (the "NO" prong of block 505), the effective use of system 100 is halted (block 510).

In general, the component generating the challenge (injecting code into an executing code path at run-time) is a trusted component of system 100 so that its operation can be relied upon. In one embodiment, designed for use on a platform executing the MAC OS X operating system ("OS") from APPLE COMPUTER, INC. of Cupertino, Calif., the component responsible for generating challenges (block 500), determining the veracity of the results thereto (block 505) and, if necessary, halting the system (block 510) is the dynamic translator component of the operating system.

Figure 6:
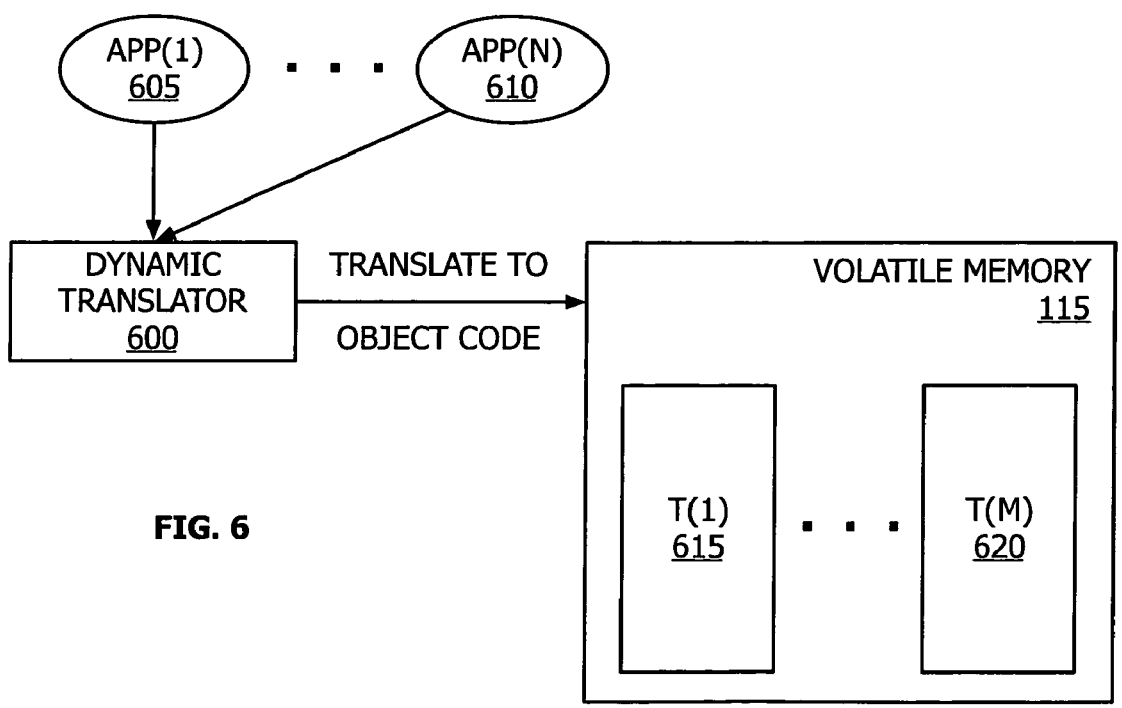
FIG. 6 shows, in block diagram form, a dynamic translator in accordance with one embodiment of the invention.

It will be recognized that the dynamic translator is that component of the operating system that invokes and manages dynamically generated object code threads. That is, threads (or processes) whose object code and execution are controlled through just-in-time ("JIT") compilation techniques. In the MAC OS X, the dynamic translator is responsible for the execution of, inter alia, system and user interface critical applications such as, for example, the system font server and system user-interface server applications. In other embodiments, however, dynamically generated object code entities (e.g., threads or processes) may be associated with any application. For example, spreadsheet, word processing or audio playback applications. Referring to FIG. 6, in the MAC OS X environment, dynamic translator 600 retrieves code at runtime associated with certain system critical applications (APP (1) 605 through APP(N) 610) and compiles the code for execution into threads (T(1) 615 through T(M) 620) that run in operating system dedicated RAM 115. As part of this process, dynamic translator 600 maintains information identifying which applications have threads instantiated in memory 115, which applications each thread is associated with and the state of each thread (e.g., executing or blocked).

Figure 7:
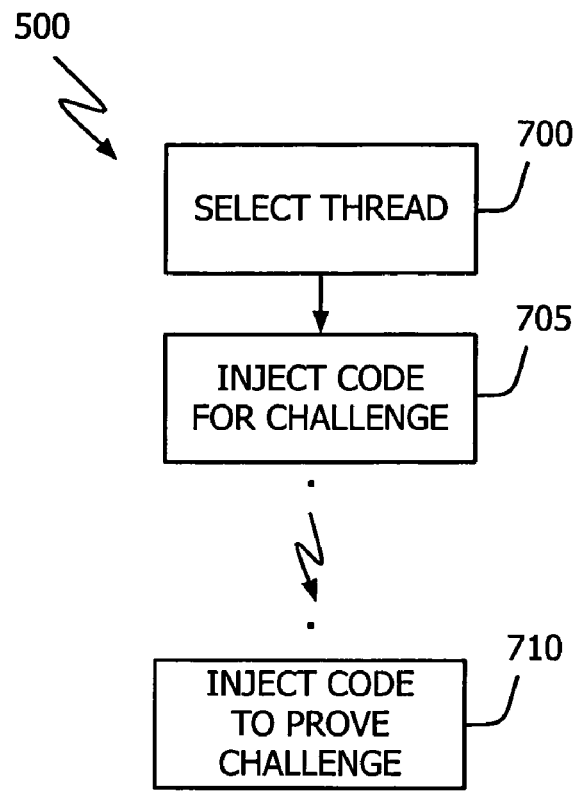
FIG. 7 shows, in flowchart form, the operations associated with generating a challenge in accordance with FIG. 5.

Referring to FIG. 7, a more detailed discussion of the acts associated with block 500 are described. At periodic times (e.g., every 5-10 minutes) dynamic translator 600 selects a thread from those it has instantiated (block 700). In general, the selected time period should be small enough to prevent significant use of an unauthorized application or system, yet long enough so as not to degrade system performance. In one embodiment, threads are selected randomly from all those threads available to dynamic translator 600, excluding those currently being used to generate challenges. In another embodiment, dynamic translator 600 selects a thread based upon one or more specified criteria. For example, the most recently (or least recently) invoked thread not already being used to generate a challenge. Next, dynamic translator 600 injects instructions into the translated code stream to cause the selected thread to generate a cryptographic challenge (block 705). At some time in the future (e.g., 30 seconds to 2 minutes), dynamic translator 600 injects instructions into the translated code stream to cause the selected thread to obtain the results of the cryptographic challenge from TPM 130 and prove the challenge (block 710). It will be recognized that the acts of block 710 are performed after TPM 130 has had an opportunity to complete its tasks (see discussion below).

Figure 8:
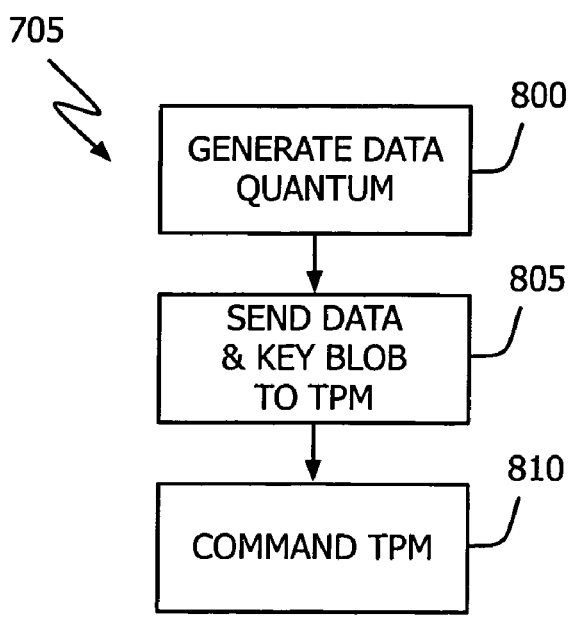
FIG. 8 shows, in flowchart form, further operations associated with generating a challenge in accordance with FIG. 7.

In one embodiment, instructions injected into a thread's translated code stream by dynamic translator 600 in accordance with block 705 perform the functions outlined in FIG. 8. First, a quantum of data is generated (block 800). In one embodiment, the quantum is twenty (20) bytes of randomly generated data. Next, the data quantum and key blob 410 obtained during the acts of block 405 are transmitted to TPM 130 (block 805) which is then commanded to "sign" the data quantum (block 810). In accordance with cryptologic standards, TPM 130 will then initiate a process that extracts the authorizing entity's private key from key blob 410 and use the extracted private key to "sign" the data quantum—producing a "signed block." In one embodiment, key blob 410 is transmitted to a TPM each time a challenge is generated (see FIG. 8). In another embodiment, the TPM is loaded with key blob 410 at computer system boot time and/or whenever a system wake event occurs (i.e., upon coming out of a system "sleep" operation).

Figure 9:
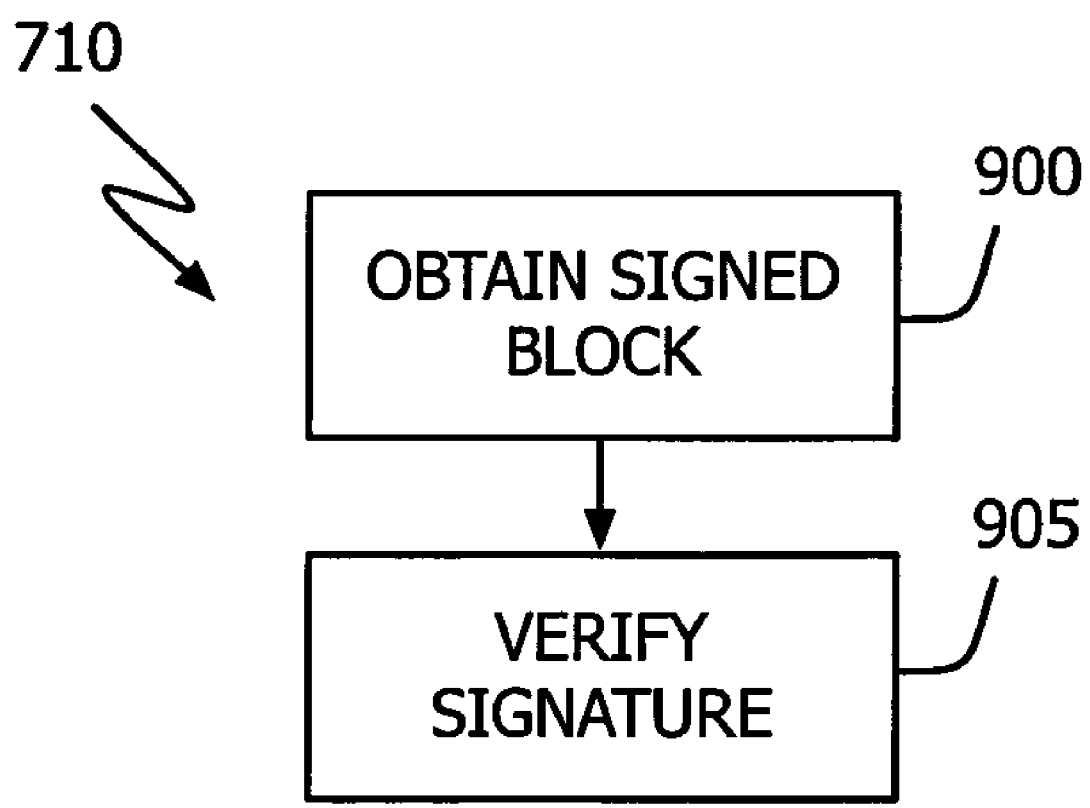
FIG. 9 shows, in flowchart form, operations associated with solving a challenge in accordance with FIG. 7.

In one embodiment, instructions inserted into a thread's translated code stream by dynamic translator 600 in accordance with block 710 perform the functions outlined in FIG. 9. As shown, the thread first obtains the signed block (block 900) and then verifies the signature by performing a cryptologic signature verification (block 905). Illustrative signature verification algorithms include, but are not limited to, the digital signature algorithm ("DSA") as specified in the digital signature standard ("DSS") published by the US government (see, for example, the Federal Information Processing Standards Publication 186) or a compatible algorithm such as, for example, an RSA digital signature algorithm.

Referring again to FIG. 5, in the described embodiment the acts of block 505 correspond to determining whether the signature verification algorithm used in accordance with block 710 indicates a match (meaning the data quantum generated in accordance with block 800 was signed by the private key encoded within key blob 410 and passed to the TPM during the acts of block 805) or not. Since the only way the data quantum could have been signed using the authorizing entity's private key was for that key to be encoded within key blob 410 during pre-use phase 205, a match (the "YES" prong of block 505) indicates the hardware platform is authorized to use the specific application(s) executing thereon. A match failure (the "NO" prong of block 505) indicates the hardware platform is not authorized to do so. In accordance with block 510, the thread associated with a failed challenge is terminated—effectively disabling continued use of system 100. In one embodiment, only the thread associated with the failed challenge is halted. In another embodiment, the dynamic translator is halted. In yet another embodiment, all threads associated with the application associated with the failed challenge are halted.

In an embodiment utilizing dynamic translator 600 (or a functionally similar component), threads may not be able to obtain the results of a challenge for one or more reasons. For example, the selected thread may terminate abnormally before a challenge is proved (block 710). In addition, the selected thread may block precluding the timely performance of proving a challenge. In the event either of this conditions are detected (such information being available to dynamic translator 600), another thread may be selected where after acts in accordance with block 500 are initiated for that thread. It will be understood that this approach permits more than one challenge to be "in progress" at any given time.

A digital authorization, or run-time check, technique in accordance with the invention permits an authorizing entity to restrict the execution of specific applications to unique (pre-authorized) hardware platforms in a secure manner. For example, using dynamic translator 600 (or a functionally similar component) in the manner described permits a substantially unpredictable memory location from which challenges are generated and proved. Additional security may be obtained by calculating the authorizing entity's public key (see block 905) rather than retrieving it from a predetermined location. For still additional security, memory 115 assigned by dynamic translator 600 (or a functionally similar component) to a thread used in accordance with the invention may be tagged for immediate reuse by another thread/application in the event authorization in accordance with block 505 fails, or, once the thread completes processing (in the event authorization in accordance with block 505 is successful). Further, by ensuring the time between issuing successive challenges is relatively short (e.g., 5 to 10 minutes), a single authorized platform can be precluded from acting as an "authoring agent" for a commercially significant number of secondary systems. (That is, the TPM component of an authorized platform can be substantially prevented from being used by secondary, unauthorized, systems.)

Various changes in the materials, components, circuit elements, as well as in the details of the illustrated operational methods are possible without departing from the scope of the following claims. In one variation, pre-use phase 205 can be implemented after manufacture as long as the agent providing the authorizing entity's key has access to same. In these "post-build" embodiments, TPM 130 or system flash memory may be used to retain a plurality of hardware platform specific key blobs—one for each application or entity granting a user the right to execute their application(s). In another variation TPM 130 is not used. That is, the inventive techniques to perform checks through run-time code injection may be used in systems that do not have a TPM or other hardware dedicated cryptologic computational engine. In these cases, a general purpose computational element (e.g., a central processing or arithmetic processing unit) may be used instead of TPM 130. In addition, the illustrative system of FIG. 1 may include additional or fewer components than shown. Further, acts in accordance with FIGS. 2-9 may be performed by a programmable control device executing instructions organized into one or more program modules. A programmable control device may be a single computer processor, a special purpose processor (e.g., a digital signal processor, "DSP"), a plurality of processors coupled by a communications link or, at least in part, by a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description was presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

The invention claimed is:

1. A digital rights management method, comprising:
   selecting an execution unit associated with an application;
   injecting first instructions into the selected execution unit to generate a cryptologic challenge;
   obtaining a response to the cryptologic challenge; and
   halting the execution unit if the obtained response does not satisfy the cryptologic challenge.

2. The method of claim 1, wherein the act of selecting an execution unit comprises periodically selecting an execution unit.

3. The method of claim 1, wherein the act of selecting an execution unit comprises selecting a thread.

4. The method of claim 1, wherein the act of selecting an execution unit comprises selecting a process.

5. The method of claim 1, wherein the act of selecting an execution unit comprises selecting an execution unit associated with a user-interface critical application.

6. The method of claim 1, wherein the act of generating a cryptologic challenge comprises:
   obtaining a data quantum;
   obtaining a key blob; and
   transmitting the data quantum and key blob to a trusted platform module.

7. The method of claim 6, wherein the act of obtaining a data quantum comprises randomly generating a specified amount of data.

8. The method of claim 6, wherein the act of obtaining a key blob comprises retrieving the key blob from a memory.

9. The method of claim 1, wherein the act of obtaining comprises retrieving the response from a trusted platform module.

10. The method of claim 6, wherein the act of obtaining a response comprises obtaining a signature from the trusted platform module.

11. The method of claim 10, wherein the act of obtaining a signature from the trusted platform module comprises retrieving the signature from the trusted platform module.

12. The method of claim 10, wherein the act of obtaining a response further comprises verifying the signature through a signature verification algorithm.

13. The method of claim 1, wherein the act of halting comprises causing the execution unit to terminate.

14. The method of claim 13, further comprising causing volatile memory associated with the execution unit to be reused substantially immediately for another execution unit.

15. The method of claim 1, wherein the act of halting further comprises causing one or more execution units associated with other applications to terminate.

16. A method to restrict execution of an application, comprising:
   selecting an execution unit associated with an application whose execution is to be restricted to a hardware platform; and
   causing the execution unit to
   obtain a data quantum,
   obtain a key blob associated with an authorizing entity associated with the application,
   obtain a signature from a cryptologic engine associated with the hardware platform based on the data quantum and obtained key blob,
   verify the signature and
   halt if the signature verification fails.

17. The method of claim 16, wherein the act of selecting an execution unit comprises periodically selecting an execution unit.

18. The method of claim 16, wherein the act of selecting an execution unit associated with an application comprises selecting a thread associated with an operating system.

19. The method of claim 18, wherein the act of selecting a thread associated with an operating system comprises selecting a thread associated with a user-interface critical application.

20. The method of claim 16, wherein the act of selecting an execution unit comprises randomly selecting an execution unit from a plurality of execution units associated with the application whose execution is to be restricted.

21. The method of claim 16, wherein the act of causing the execution unit to obtain a data quantum comprises causing the execution unit to generate a specified amount of data.

22. The method of claim 21, wherein the act of causing the execution unit to generate a specified amount of data comprises causing the execution unit to randomly generate a specified amount of data.

23. The method of claim 16, wherein the act of causing the execution unit to obtain a data quantum comprises causing the execution unit to retrieve the data quantum from a specified location.

24. The method of claim 16, wherein the act of causing the execution unit to obtain a signature comprises causing the execution unit to send the data quantum and key blob the cryptologic engine and, thereafter, retrieve the signature from the cryptologic engine.

25. The method of claim 16, wherein the act of causing the execution unit to obtain a signature comprises causing the execution unit to send the data quantum and key blob to a trusted platform module.

26. The method of claim 16, wherein the act of causing the execution unit to verify the signature comprises causing the execution unit to apply the data quantum, the key blob and the signature to a signature verification algorithm.

27. The method of claim 16, wherein the act of causing the execution unit to halt comprises causing the execution unit to terminate.

28. The method of claim 27, further comprising causing volatile memory associated with the execution unit to reused substantially immediately for another execution unit.

29. A digital rights management method, comprising:
   selecting a thread associated with an application;
   sending, by the selected thread, a data quantum and a first cryptologic key element associated with an authorizing entity to a cryptologic engine, wherein the cryptologic engine is a component of a hardware platform on which the selected thread is executing;
   obtaining, by the selected thread, a signature from the cryptologic engine in response to the act of sending;
   verifying, by the selected thread, the signature was created using a key associated with the first cryptologic key element; and
   terminating the selected thread if the act of verifying fails.

30. The method of claim 29, wherein the act of sending a first cryptologic key element comprises sending a key blob encoding a private key.

31. The method of claim 29, wherein the act of sending a data quantum and a first cryptologic key element to a cryptologic engine comprises sending the data quantum and first cryptologic key element to a trusted platform module.

32. The method of claim 29, wherein the act of verifying comprises applying the signature, data quantum and first cryptologic key element to a digital signature verification algorithm.

33. The method of claim 29, wherein the act of terminating comprises:
   releasing memory used by the selected thread for execution; and
   substantially immediately reusing the memory for execution of another thread.

34. A system, comprising:
   volatile memory;
   a trusted platform module having non-volatile memory; and
   a central processing unit communicatively coupled to the volatile memory and the trusted platform module, said central processing unit adapted to execute an application in the volatile memory having at least one execution unit, the execution unit comprising computer executable instructions for causing at least one of the at least one execution units to:

obtain a data quantum, obtain a cryptologic key element associated with the application, obtain a signature from the trusted platform module based on the data quantum and the cryptologic key element, verify the signature was generated using a cryptologic key associated with the first cryptologic key element, and halt if the signature verification fails.

35. The system of claim 34, wherein the execution unit comprises a thread.

36. The system of claim 34, wherein the volatile memory, trusted platform module and central processing unit comprise components of a computer server system.

37. The system of claim 34, wherein the application comprises an operating system application.

38. The system of claim 34, wherein the application comprises a user-level application.

39. The system of claim 34, wherein the instructions to obtain a data quantum comprise instructions to randomly generate a specified amount of data.

40. The system of claim 34, wherein the instructions to cause the execution unit to halt comprise instructions to, substantially immediately, assign volatile memory associated with the execution unit to another execution unit.

* * * * *

UNITED STATES PATENT AND TRADEMARK OFFICE
CERTIFICATE OF CORRECTION

| | | |
|---|---|---|
| PATENT NO. | : 7,694,341 B2 | |
| APPLICATION NO. | : 11/207045 | |
| DATED | : April 6, 2010 | |
| INVENTOR(S) | : James Mensch et al. | |

It is certified that error appears in the above-identified patent and that said Letters Patent is hereby corrected as shown below:

On the face page, in field (75), under "Inventors", in column 1, line 2, delete "Windemere," and insert -- Windermere, --, therefor.

In column 1, line 4, delete "BACKGROUND" and insert -- CROSS-REFERENCE TO RELATED APPLICATION --, therefor.

In column 1, line 10, below "reference." insert -- BACKGROUND -- as a new heading.

In column 3, line 19, delete "intera/ia," and insert -- inter alia, --, therefor.

Signed and Sealed this
Eighth Day of November, 2011

David J. Kappos
*Director of the United States Patent and Trademark Office*